(12) United States Patent
Lemery (10) Patent No.: US 11,548,609 B2
(45) Date of Patent: Jan. 10, 2023

(54) MOISTURE CONTROL SYSTEMS AND METHODS FOR CONTROLLING MOISTURE IN AN AIRCRAFT

(71) Applicant: The Boeing Company, Chicago, IL (US)

(72) Inventor: Steven G. Lemery, Chicago, IL (US)

(73) Assignee: The Boeing Company, Chicago, IL (US)

( * ) Notice: Subject to any disclaimer, the term of this patent is extended or adjusted under 35 U.S.C. 154(b) by 863 days.

(21) Appl. No.: 16/275,416

(22) Filed: Feb. 14, 2019

(65) Prior Publication Data

US 2020/0262538 A1    Aug. 20, 2020

(51) Int. Cl.
*B64C 1/06* (2006.01)
*B01D 61/56* (2006.01)

(52) U.S. Cl.
CPC ............... *B64C 1/067* (2013.01); *B64C 1/06* (2013.01); *B64C 1/061* (2013.01); *B64C 1/064* (2013.01); *B64C 1/066* (2013.01); *B01D 61/56* (2013.01)

(58) Field of Classification Search
CPC ......... B64C 1/067; B64C 1/061; B64C 1/064; B01D 53/22; B01D 61/56; E04B 1/7007
See application file for complete search history.

(56) References Cited

U.S. PATENT DOCUMENTS

| 3,657,106 A | 4/1972 | Smith |
| 3,725,233 A | 4/1973 | Smith |
| 8,844,868 B2 * | 9/2014 | Kolax ............... B64C 1/064 244/119 |
| 9,546,004 B1 | 1/2017 | Safai et al. |
| 9,944,379 B2 | 4/2018 | Berryessa |
| 2017/0113776 A1 * | 4/2017 | Johnson ............. B64D 15/163 |
| 2018/0362134 A1 | 12/2018 | Richardson et al. |

FOREIGN PATENT DOCUMENTS

| DE | 4329219 A1 * | 3/1994 | ......... E04B 1/7007 |
| DE | 10058507 A1 * | 6/2002 | ......... B01D 61/56 |
| JP | S 61 259716 | 11/1986 | |
| JP | H08 190386 | 7/1996 | |
| WO | WO 2004/028670 | 4/2004 | |
| WO | WO-2004028670 A1 * | 4/2004 | ............. B60N 2/56 |

OTHER PUBLICATIONS

Translation of WO 2004/028670 A1 (Year: 2004).*
DE-4329219-A1 Translation (Year: 1994).*
DE-10058507-A1 Translation (Year: 2002).*
Extended European Search Report prepared by the European Patent Office in application No. EP 20 15 6971.2 dated Jun. 29, 2020.

* cited by examiner

*Primary Examiner* — Richard R. Green
*Assistant Examiner* — Steven J Shur
(74) *Attorney, Agent, or Firm* — McDonnell Boehnen Hulbert & Berghoff LLP (57) ABSTRACT

A moisture control system includes an anode coupled to an insulation blanket that is positioned between an inner wall and an outer wall of an aircraft fuselage, a cathode coupled to an interior surface of the outer wall, and a power control unit coupled to the anode and the cathode to apply voltage across the anode and the cathode. When the voltage is applied across the anode and the cathode, moisture is drawn away from the anode and toward the cathode on the interior surface of the outer wall and guided along a drainage path provided via structural members disposed between the inner wall and the outer wall toward a drainage port.

20 Claims, 9 Drawing Sheets

MOISTURE CONTROL SYSTEMS AND METHODS FOR CONTROLLING MOISTURE IN AN AIRCRAFT

FIELD

The present disclosure relates generally to moisture control in an aircraft, and more particularly, to using electro-osmotic techniques for moisture control in the aircraft.

BACKGROUND

An aircraft such as a passenger jet aircraft typically includes insulation blankets that line an interior of the aircraft's fuselage. The insulation blankets can be made of fiberglass or other materials and provide both acoustic and thermal insulation for the aircraft.

During travel at high altitudes, air within an aircraft (e.g., a passenger jet aircraft) can become high in humidity and a fuselage of the aircraft can become cold. The combination of humidity and cold can cause water from the air to condense and/or freeze to the fuselage. As the aircraft lowers its altitude, this water flows downward due to gravity, which can cause an accumulation of moisture on and in the insulation blankets, as well as in other areas of the aircraft. The accumulation of moisture on and in the insulation blankets can saturate the insulation blankets, thereby undesirably increasing weight of the aircraft and potentially creating an environment in which mold can form. In addition, the accumulation of moisture can potentially cause damage to areas of the aircraft near the insulation blankets or in other areas. For example, moisture that accumulates on metal areas can corrode those surfaces. As another example, moisture that accumulates on composite laminate areas can egress into the composite laminate and then, if the moisture becomes cold and freezes, the moisture can expand and cause delamination.

Existing systems for relieving the aircraft of moisture typically include using passive physical structures within the aircraft as dams for blocking moisture flow into certain areas of the aircraft and as channels for routing water to drain masts where the water can exit the aircraft. However, these existing systems can be inefficient, can sometimes add weight and complexity to the aircraft, and might not alleviate or prevent moisture buildup in the aircraft.

What is needed is an efficient, reliable system for moisture control in an aircraft.

SUMMARY

In an example, a moisture control system is described comprising an anode coupled to an insulation blanket that is positioned between an inner wall and an outer wall of an aircraft fuselage, a cathode coupled to an interior surface of the outer wall, and a power control unit coupled to the anode and the cathode to apply voltage across the anode and the cathode, and when the voltage is applied across the anode and the cathode, moisture is drawn away from the anode and toward the cathode on the interior surface of the outer wall and guided along a drainage path provided via structural members disposed between the inner wall and the outer wall toward a drainage port.

In another example, an aircraft is described comprising a fuselage comprising an inner wall, an outer wall, and structural members coupled between the inner wall and the outer wall. The structural members form a drainage path terminating at a drainage port. The aircraft also comprises an insulation blanket positioned between the inner wall and the outer wall, an anode coupled to the insulation blanket, a cathode coupled to an interior surface of the outer wall, and a power control unit coupled to the anode and the cathode to apply voltage across the anode and cathode. When the voltage is applied across the anode and the cathode, moisture is drawn away from the anode and toward the cathode on the interior surface of the outer wall and guided along a drainage path provided via the structural members toward the drainage port.

In another example, a method for controlling moisture in an aircraft is described. The method comprises coupling an anode to an insulation blanket that is positioned between an inner wall and an outer wall of an aircraft fuselage, coupling a cathode to an interior surface of the outer wall, and causing a power control unit to apply voltage across the anode and the cathode, thereby drawing moisture away from the anode and toward the cathode on the interior surface of the outer wall and guiding the moisture along a drainage path provided via structural members disposed between the inner wall and the outer wall toward a drainage port.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Figure 1:
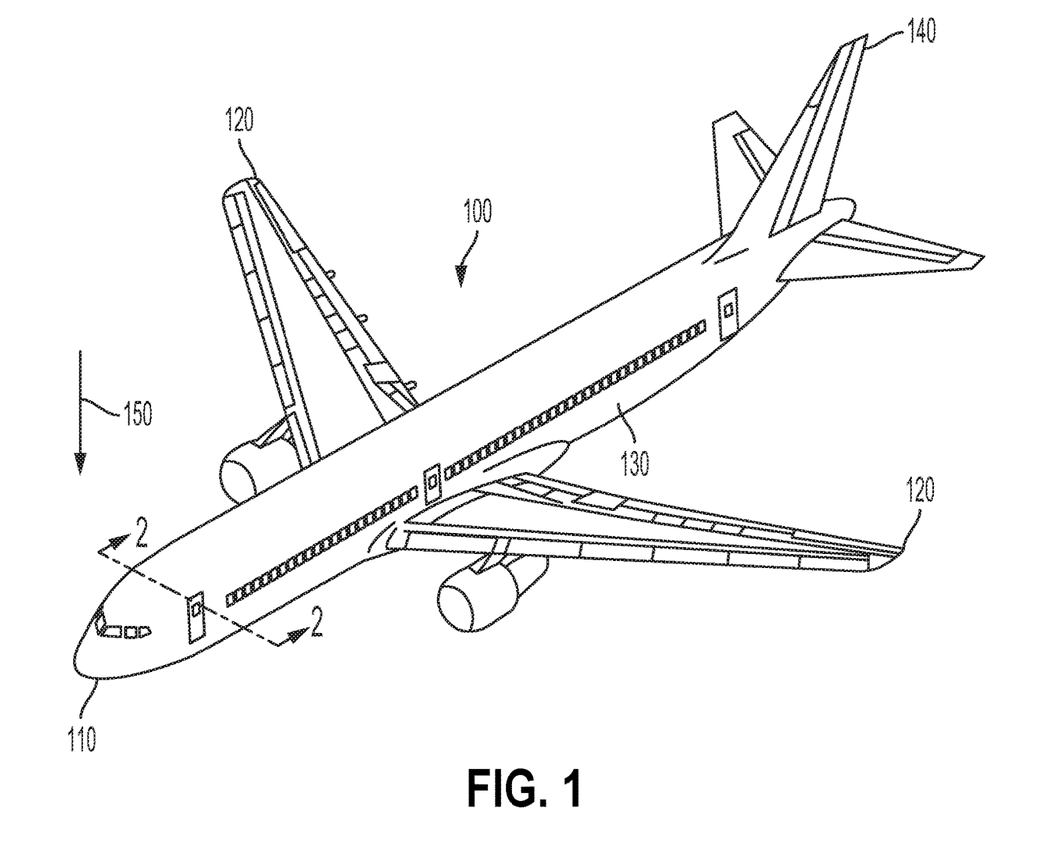
FIG. 1 shows an aircraft, according to an example implementation.

FIG. 1 shows an aircraft 100, according to an example implementation. The aircraft 100 includes a nose 110, wings 120, a fuselage 130, and a tail 140. FIG. 1 also illustrates a downward arrow 150 indicating an expected direction in which a force of gravity will pull objects, such as liquid water, onboard an aircraft 100 in a nominal operational profile.

Figure 2:
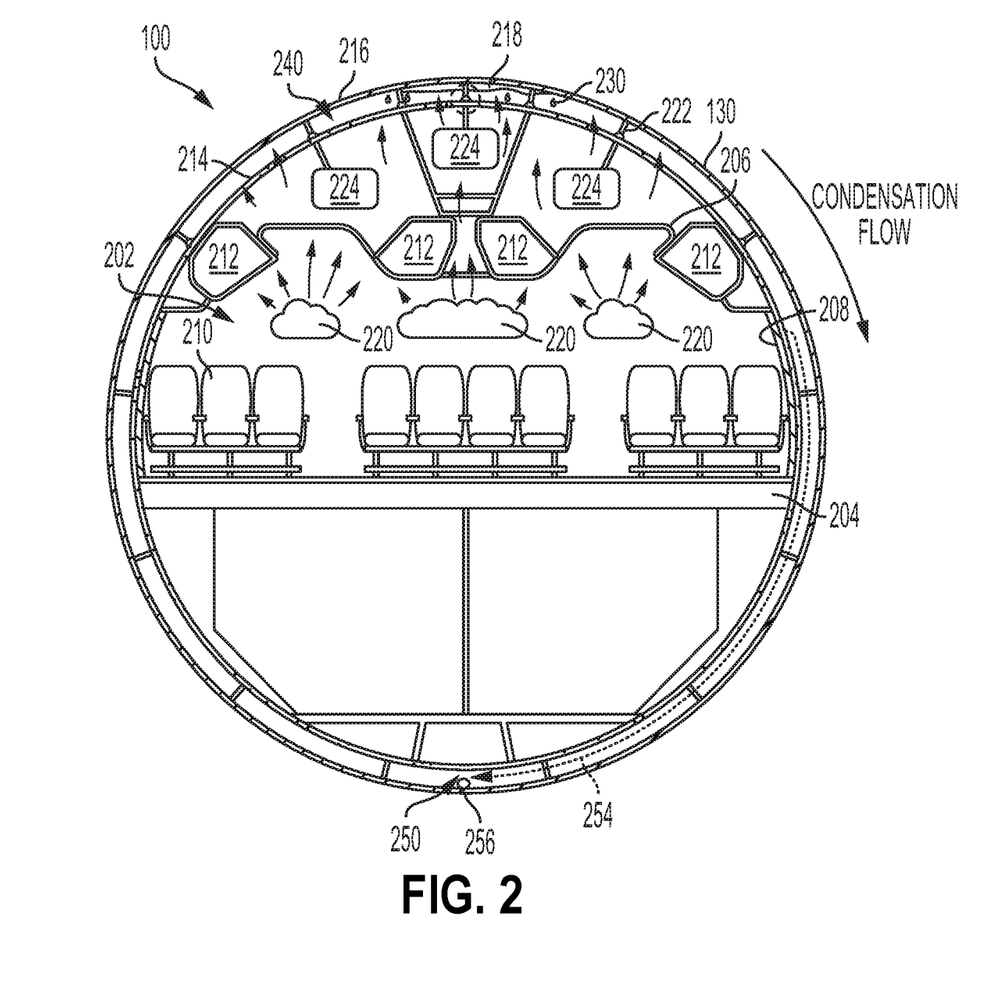
FIG. 2 is a cross-sectional, schematic view of the aircraft indicated by view arrows 2 in FIG. 1, according to an example implementation.

FIG. 2 is a cross-sectional, schematic view of the aircraft 100 indicated by view arrows 2 in FIG. 1, according to an example implementation. The fuselage 130 includes a floor 204, a ceiling 206, and an aesthetic fascia wall or an inner wall 208 that defines a cabin 202, where the ceiling 206 and/or the inner wall 208 represents an interior wall of the aircraft 100 for purposes of this Description. The inner wall 208 is a lining that separates a main cabin, cockpit, and/or other areas within the aircraft 100 from an insulation blanket 214 and the fuselage 130. The inner wall 208 can be made of plastic, glass-fiber, carbon fiber, glass-reinforced resin, other reinforced polymers, and/or other materials. The inner wall 208 can be designed to provide thermal and acoustic insulation as well.

Passengers in the aircraft 100 may congregate in seats 210 of the cabin 202 during flight. FIG. 2 illustrates that, inside of the fuselage 130 (e.g., in the cabin 202), respiration and other sources of water cause a moisture 220 to enter or form in the air in the cabin 202. For example, warm exhaled air includes the moisture 220 and rises upward through luggage compartments 212. Some of this warm and moist air rises through the ceiling 206. Furthermore, some warm air continues to rise upward through the insulation blanket 214 (or insulation blanket) into a space 240 between the insulation blanket 214 and an outer wall 216 of the aircraft 100, also known as the aircraft skin.

Referring again to FIG. 2, as the outer wall 216 is cooled by outside air at high altitude during flight, the temperature of the outer wall 216 eventually decreases to a temperature below a freezing temperature of water. This cooling causes the moisture 220 (e.g., water) to condense out of the air in the space 240 and freeze onto an interior surface of the outer wall 216 as ice 218. As the aircraft 100 changes to a lower altitude and/or commences descent for landing and the temperature increases, the ice 218 begins to melt causing water droplets 230 to travel through the space 240 towards a bottom 250 of the fuselage 130, drawn by gravitational force as shown by the downward arrow 150. Some water droplets 230 enter gaps in the insulation blanket 214, particularly where structural members 222 pass through apertures within the insulation blanket 214, and drip into the cabin 202, sometimes on passengers. Further, some water droplets 230 collect in the insulation blanket 214 as well. The moisture cycle of water cooling, freezing, and then melting can creates issues of liquid management for the aircraft 100.

A size of the space 240 has been exaggerated somewhat in FIG. 2 in order to more clearly show the details of the structure. The structural members 222 are often used for attaching aircraft components 224, such as the luggage compartments 212, the ceiling 206, ducting, equipment, and racks, as examples. For simplicity, common aircraft load bearing components such as stringers and/or frame members are not shown, but it should be understood that in some aspects, the structural members 222 attach various aircraft components to stringers and/or frame members, and not directly to the outer wall 216 of the aircraft 100.

Thus, the structural members 222 can include frames, stringers, and/or other mechanical elements (e.g., longerons, spars, beams, trusses) that are fastened (e.g., with bolts, rivets, pins, or other fasteners), bonded (e.g., with an adhesive), welded, or otherwise attached to the inner wall 208 and outer wall 216. The structural members 222 can be made of metallic material (e.g., aluminum) and/or non-metallic material (e.g., composite material). At least some of the structural members 222 can also be load-bearing. Additionally, at least some of the structural members 222 can be interconnected—namely, fastened, bonded, welded, or otherwise attached to each other. Further, at least some of the structural members 222 can include notches through which the water droplets 230 can flow. (These notches are shown below in FIG. 4).

Within examples, a moisture control system and method for controlling moisture in the aircraft 100 are described that can increase reliability and efficiency of removing moisture, while reducing weight and complexity from existing aircraft drainage systems. Existing systems add weight to the aircraft with additional structures and are more passive in nature in that they heavily rely on gravity to bring moisture to drain masts or other areas where the moisture can exit the aircraft. In contrast, the disclosed systems and methods involve arranging cathodes and anodes inside the aircraft 100 such that, when a voltage is applied across the cathodes and anodes, moisture is drawn out and away from the insulation blanket 214, toward an interior surface of the outer wall 216 of the fuselage 130. Additionally, the applied voltage keeps moisture away from the insulation blanket 214 and drives moisture along a drainage path 254 toward a drainage port 256. As such, the disclosed systems and methods can efficiently promote drainage of moisture in the aircraft 100 without adding much weight to the aircraft, and can also efficiently and proactively prevent moisture from accumulating on and in the insulation blanket 214.

Figure 3:
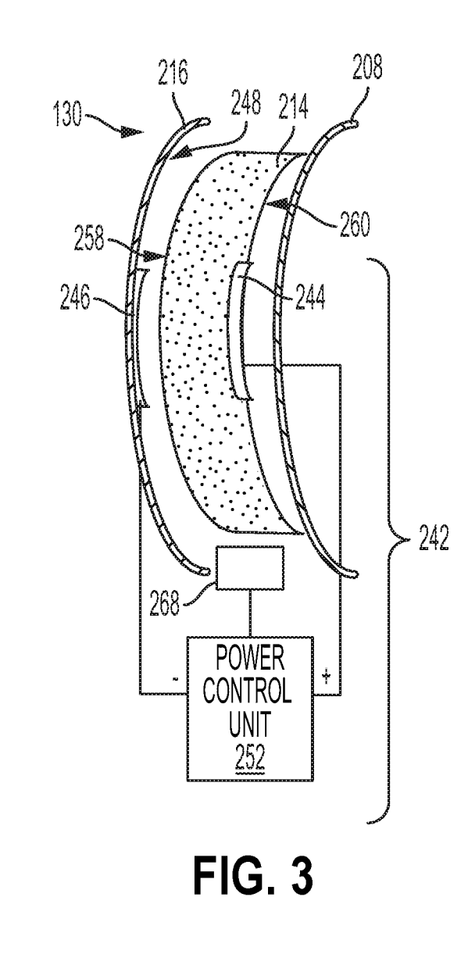
FIG. 3 illustrates a portion of the fuselage as shown in FIG. 2, according to an example implementation.

FIG. 3 illustrates a portion of the fuselage 130 as shown in FIG. 2, according to an example implementation. The fuselage 130 includes the inner wall 208, the outer wall 216, and the 222 structural members (shown in FIG. 2) coupled between the inner wall 208 and the outer wall 216. As shown in FIG. 2, the structural members 222 form the drainage path 254 terminating at the drainage port 256. The insulation blanket 214 is positioned between the inner wall 208 and the outer wall 216.

The fuselage 130 includes a moisture control system 242, which includes an anode 244 coupled to the insulation blanket 214 that is positioned between the inner wall 208 and the outer wall 216 of the fuselage 130, a cathode 246 coupled to an interior surface 248 of the outer wall 216, and a power control unit 252 coupled to the anode 244 and the cathode 246 to apply voltage across the anode 244 and the cathode 246. When the voltage is applied across the anode 244 and the cathode 246, moisture is drawn away from the anode 244 and toward the cathode 246 on the interior surface 248 of the outer wall 216 and guided along the drainage path 254 provided via the structural members 222 disposed between the inner wall 208 and the outer wall 216 toward the drainage port 256.

The inner wall 208 is a surface of the fuselage 130 that is located in an interior of the aircraft 100 and is opposite the outer wall 216 of the fuselage 130. Like the fuselage 130, the inner wall 208 can be made of aluminum, an aluminum-lithium alloy, a composite laminate, and/or other metallic or non-metallic materials.

The insulation blanket 214 is positioned between the inner wall 208 and the outer wall 216, and the insulation blanket 214 includes an exterior face 258 positioned adjacent to the outer wall 216 and an interior face 260 opposite the exterior face 258. In FIG. 2, the anode 244 is shown coupled to the interior face 260 of the insulation blanket 214, and when the voltage is applied, the moisture accumulated on and in the insulation blanket 214 is drawn out and away from the insulation blanket 214 towards the cathode 246. In other examples, however, the anode 244 may be coupled to the exterior face 258 of the insulation blanket 214.

The insulation blanket 214 is made of fiberglass, polyetherketoneketon, polyetheretherketone, ethylene chlorotrifluoroethylene, aramid paper, and/or other materials and is designed to acoustically and thermally insulate an interior of the aircraft 100 from noise and temperature outside the aircraft. The insulation blanket 214 can be fastened, adhered, or otherwise attached to the inner wall 208, the outer wall 216, and/or to the structural members 222, thus securing the insulation blanket 214 in place. For example, pins can penetrate the insulation blanket 214 to attach the insulation blanket 214 to the outer wall 216, and stainless steel spring clips can clamp around the structural members 222 to attach the insulation blanket 214 to the structural members 222. Holes formed by the pins penetrating the insulation blanket 214 can be sealed with felt washers and tape. Other examples are possible as well. The insulation blanket 214 can be one of multiple insulation blankets attached throughout the fuselage 130.

The exterior face 258 and the interior face 260 can be made of the same material as an interior of the insulation blanket 214 or a different material. For example, the exterior face 258 and the interior face 260 can be made of a polymer film (e.g., mylar film), and a portion of the insulation blanket 214 between the exterior face 258 and the interior face 260 can be made of fiberglass. In other words, the exterior face 258 and the interior face 260 can be configured to hold the fiberglass or other insulating material inside the insulation blanket 214. Other examples are possible as well.

The anode 244 is a positively charged electrode made of a conductive material, such as copper, graphite, and/or aluminum. The anode 244 can take the form of a single wire, multiple interconnected wires (e.g., a mesh of wires, or wires arranged in another type of pattern), one or more strips of tape, a sheet, film, and/or other structure that is capable of being fastened, adhered, or otherwise attached to the insulation blanket 214. The anode 244 can have approximately the same dimensions as the insulation blanket 214 or can have different dimensions.

The cathode 246 is a negatively charged electrode made of a conductive material, such as copper, graphite, and/or aluminum. The cathode 246 can take the form of a single wire, multiple interconnected wires (e.g., a mesh of wires, or wires arranged in another type of pattern), one or more strips of tape, a sheet, film, and/or other structure that is capable of being fastened, adhered, or otherwise attached to the interior surface 248 of the outer wall 216.

In one example, the outer wall 216 of the fuselage 130 includes an electrically conductive material. If the interior surface 248 of the outer wall 216 is made of a conductive material, the cathode 246 being attached to the interior surface 248 can cause the interior surface 248 to act as a cathode as well. Thus, the cathode 246 used can be made smaller if the interior surface 248 is made of a conductive material. For example, the cathode 246 can be partitioned into a plurality of discrete cathodes positioned along the drainage path 254 (e.g., segments of conducting tape). This can also be useful in a situation in which some of the discrete cathodes become unattached from the interior surface 248, since the remaining cathode(s) could still be used to provide conductivity needed for applying the voltage.

Alternatively, if the interior surface 248 is made of a non-conductive material, it can be desirable to have the cathode 246 be larger, such as a single, continuous cathode strip positioned along the drainage path 254 (e.g., an elongated strip of conducting tape). Other examples are possible as well.

The power control unit 252 includes a voltage source of direct current (DC) and/or alternating current (AC) electricity and is coupled to the anode 244 and the cathode 246 to deliver electricity and apply the voltage across the anode 244 and the cathode 246. The power control unit 252 can deliver the electricity in a continuous manner or as individual pulses. The voltage applied across the anode 244 and the cathode 246 can vary and can fall within a larger range (e.g., 1 to 40 Volts (V)) or a smaller range (e.g., 26 to 28 V). Other voltages are possible. In some examples, the power control unit 252 can include hardware and/or software that enables the power control unit 252 to receive a signal that triggers the power control unit 252 to deliver electricity. For example, the moisture control system 242 may further include a moisture sensor 268 configured to detect presence of the moisture between the inner wall 208 and the outer wall 216, as well as the moisture accumulating in the insulation blanket 214, and the power control unit 252 is coupled to the moisture sensor 268 and is further configured to apply the voltage in response to the moisture sensor 268 detecting that the moisture exceeds a predefined moisture level (e.g., approximately 1.5 millimeters of the moisture). The power control unit 252 can receive the signal from the moisture sensor 268 and responsively apply the voltage across the anode 244 and the cathode 246. Additionally or alternatively, the power control unit 252 can receive the signal from a computing device within the aircraft 100 (e.g., a flight control system operated either autonomously or by a pilot or crew member of the aircraft 100), and responsively apply the voltage across the anode 244 and the cathode 246. Other examples are possible as well.

The power control unit 252 can make the determination that the moisture exceeds the predefined moisture level on its own after receiving the signal from the moisture sensor 268 (or via an instruction in the signal from the moisture sensor 268), and responsively apply the voltage. The power control unit 252 can discontinue applying the voltage as soon as the moisture falls below the predefined moisture level. In other examples, the power control unit 252 can be configured to continuously provide electricity, or pulses of electricity, in an autonomous manner, without being triggered to do so.

The moisture sensor 268 is a physical electronic device having circuitry configured to emit electromagnetic signals for detecting and measuring liquid (e.g., the moisture) that directly contacts and/or is proximate to the moisture sensor 268. The moisture sensor 268 is configured to monitor buildup of the moisture between the inner wall 208 and the insulation blanket 214, between the outer wall 216 and the insulation blanket 214, as well as the moisture accumulating in the insulation blanket 214. In particular, the moisture sensor 268 can be configured to transmit, to the power control unit 252 or to another computing device, a signal representing a level (e.g., an amount, measured in millimeters) of the moisture that is contacting the moisture sensor 268 and/or that is proximate to the moisture sensor 268.

Furthermore, the moisture sensor 268 can be wireless or operated by a wired connection, and can optionally include a battery. The moisture sensor 268 can be rigid or flexible and can vary in size, such as millimeters in width, height, and/or length. Further, the moisture sensor 268 can include an adhesive backing or other means for attaching the moisture sensor 268 to various metallic and/or non-metallic surfaces within the aircraft 100. FIG. 3 does not illustrate where the moisture sensor 268 is attached within the aircraft 100, but it should be understood that the moisture sensor 268 can be included at various locations where the moisture is present. For example, the moisture sensor 268 can be attached to the exterior face 258, to the interior face 260, to the inner wall 208, and/or within the insulation blanket 214 (i.e., in a batting of the insulation blanket 214, positioned between the exterior face 258 and the interior face 260).

A connection between the moisture sensor 268 and the power control unit 252 can be a wired interface (i.e., a physical connection, such as by way of a cable or other electrical medium through which current can flow), or a wireless interface.

In operation, the power control unit 252 applies the voltage across the anode 244 and the cathode 246, which causes the water droplets 230 and moisture to be ionized and drawn toward the cathode 246. Thus, applying the voltage causes the moisture to be drawn away from the insulation blanket 214 and toward the interior surface 248 where the cathode 246 is attached. In addition, because the cathode 246 is attached to the interior surface 248 proximate to the drainage path 254, the voltage, as well as gravity, keeps the moisture on the interior surface 248 and causes the moisture to be guided along the drainage path 254 toward the drainage port 256. Furthermore, because the anode 244 is attached to the exterior face 258, applying the voltage causes the moisture that is saturating the insulation blanket 214 to be drawn out of the insulation blanket 214 and toward the interior surface 248.

The drainage path 254 includes a physical area proximate to, on, or through the structural members 222 where the moisture flows before reaching the drainage port 256. That is, as the moisture flows downward toward the drainage port 256, the moisture physically contacts the interior surface 248 proximate to the structural members 222 and/or the structural members 222 themselves. The drainage path 254 can also be formed at least in part by ridges on, or grooves in, the interior surface 248 and/or ridges on, or grooves in, the structural members 222. For example, during a portion of the drainage path 254, the moisture might flow between two ridges formed in the interior surface 248. Other examples are possible as well.

The drainage port 256 is a physical pathway (e.g., tubes, pipes, inlet(s), outlet(s), and/or other structures) disposed in the fuselage 130 and through which the moisture can flow to exit the aircraft 100. The drainage port 256 can extend from the interior surface 248, through the fuselage 130, to an exterior of the fuselage 130. In some examples, flow of the moisture through the drainage port 256 can be controlled by a drain valve (not shown) within the drainage port 256. The drain valve might be closed when the fuselage 130 is pressurized, thus preventing the moisture from exiting the aircraft 100, and opened when the aircraft 100 is not pressurized (e.g., when the aircraft 100 is on a runway or Tarmac), thus allowing the moisture to exit the aircraft 100. The drainage port 256 can thus be configured to open automatically when the fuselage 130 is non-pressurized. Although the drainage port 256 is shown in FIG. 2 as being on the bottom 250 of the fuselage 130, the drainage port 256 can be at other locations on the fuselage 130 in other examples.

As a result, the moisture control system 242 can advantageously help alleviate an accumulation of the moisture in the insulation blanket 214, on the insulation blanket 214 (e.g., on the exterior face 258), and on the interior surface 248. The moisture control system 242 can also cause the moisture to reach the drainage port 256 faster than in existing systems. Additionally, the moisture control system 242 can advantageously prevent further moisture accumulation in the above-noted areas in a proactive manner. Further, the moisture control system 242 advantageously leverages the structural members 222 that form the fuselage 130, rather than requiring additional drainage structures that might add weight to the aircraft 100 as in existing systems.

The moisture control system 242 can be usefully implemented throughout the aircraft 100, such as in particular areas of the aircraft 100 that might be prone to more moisture accumulation than others. For example, areas surrounding doors or hatchways in the aircraft 100 might experience more airflow, and thus more moisture, than other areas in the aircraft 100. Thus, the moisture control system 242 can be particularly useful when applied in the areas surrounding the doors or hatchways, since the moisture control system 242 can efficiently remove moisture from these areas as well as help prevent additional moisture from accumulating.

Figure 4:
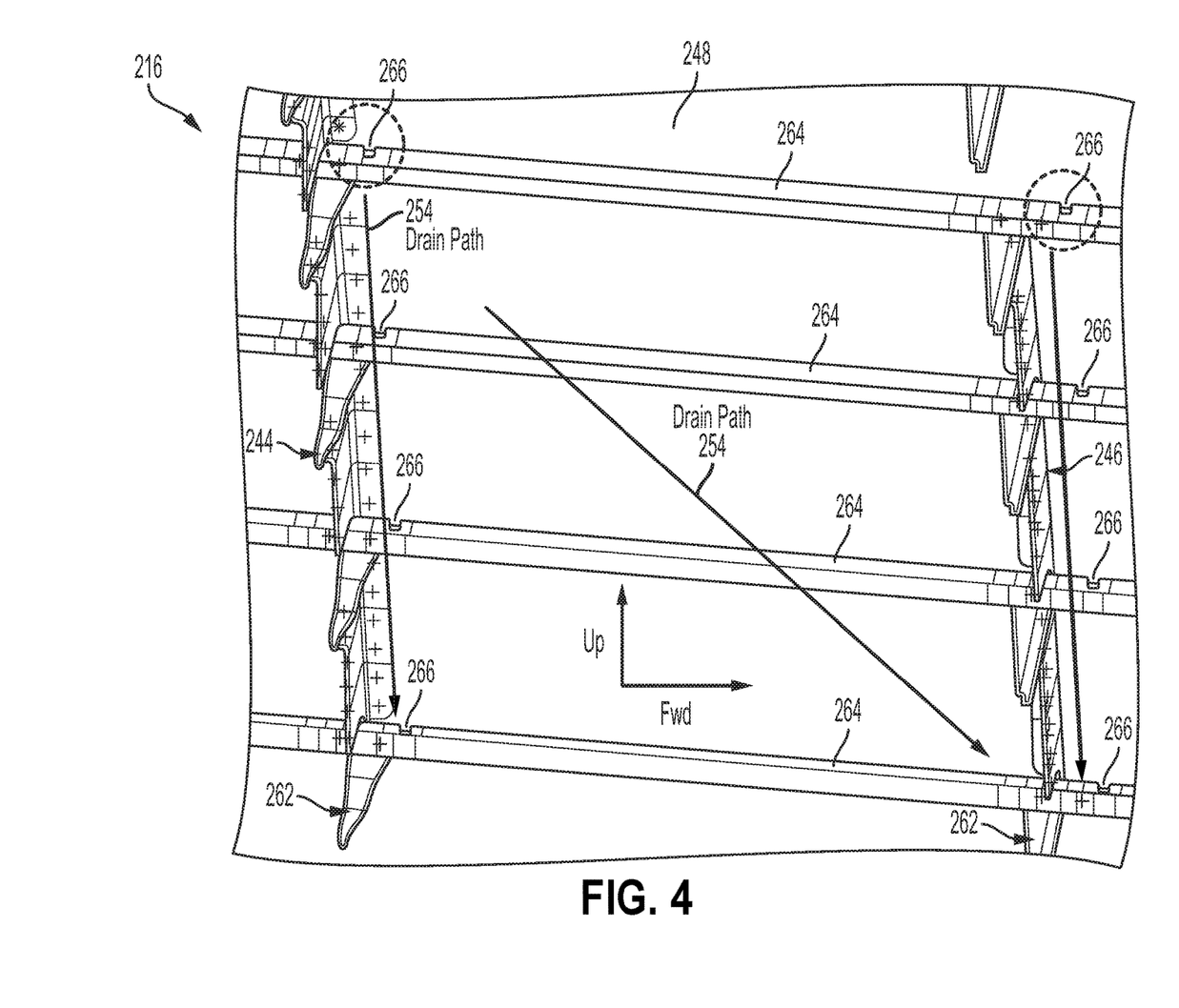
FIG. 4 shows an example of the interior surface, the structural members (shown as frames interconnected with stringers), the drainage path, and the anode and the cathode, according to an example implementation.

FIG. 4 shows an example of the interior surface 248, the structural members 222 (shown as frames 262 interconnected with stringers 264), the drainage path 254, and the anode 244 and the cathode 246, according to an example implementation. The frames 262 and the stringers 264 include notches 266 through which the moisture flows as the moisture is guided along the drainage path 254.

The cathode 246 is shown in FIG. 4 as a continuous cathode strip positioned along a vertical portion of the drainage path 254—namely, along a portion of the drainage path 254 formed by the frames 262. In operation, the voltage can be applied, which causes the moisture to flow along the drainage path 254 both downward and diagonally as denoted by the arrows shown in FIG. 4, thereby advantageously guiding the moisture toward the drainage port 256 as described above.

Figure 5:
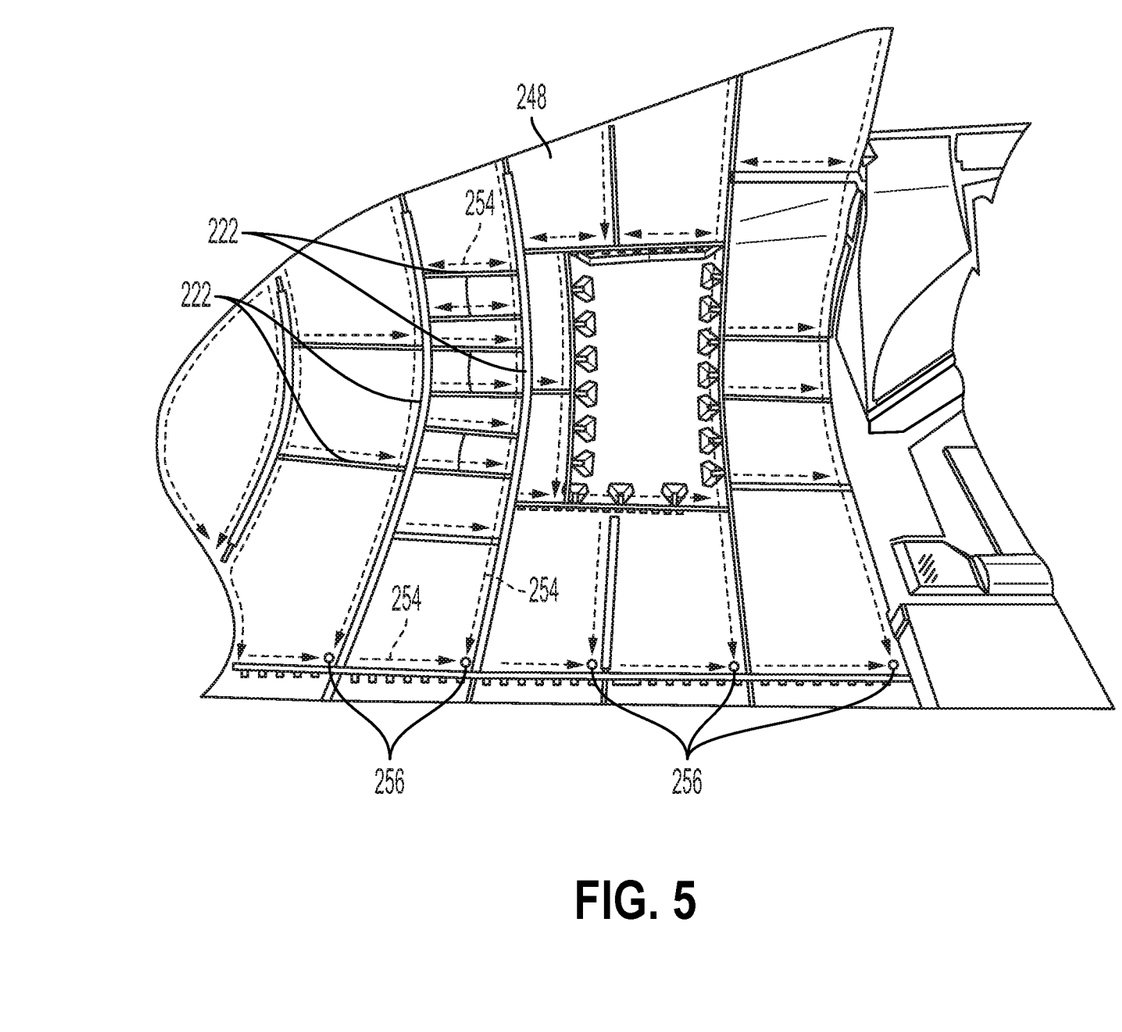
FIG. 5 shows another perspective view of an example of the drainage port, the interior surface, the structural members, and the drainage path, according to an example implementation.

FIG. 5 shows another perspective view of an example of the drainage port 256, the interior surface 248, the structural members 222, and the drainage path 254, according to an example implementation. In FIG. 5, the drainage port 256 is shown as a plurality of drainage ports disposed at various locations on the interior surface 248. Further, the structural members 222 are embodied as various interconnected frames and stringers, examples of which are denoted in FIG. 4. The dotted arrows shown in FIG. 5 represent the drainage path 254 along which the moisture can flow and can be guided toward the plurality of drainage ports using the moisture control system 242 described herein. Although the cathode is not explicitly shown, the cathode could be attached to the interior surface 248 proximate to the structural members 222 at one or more locations proximate to the arrows representing the drainage path 254.

Figure 6:
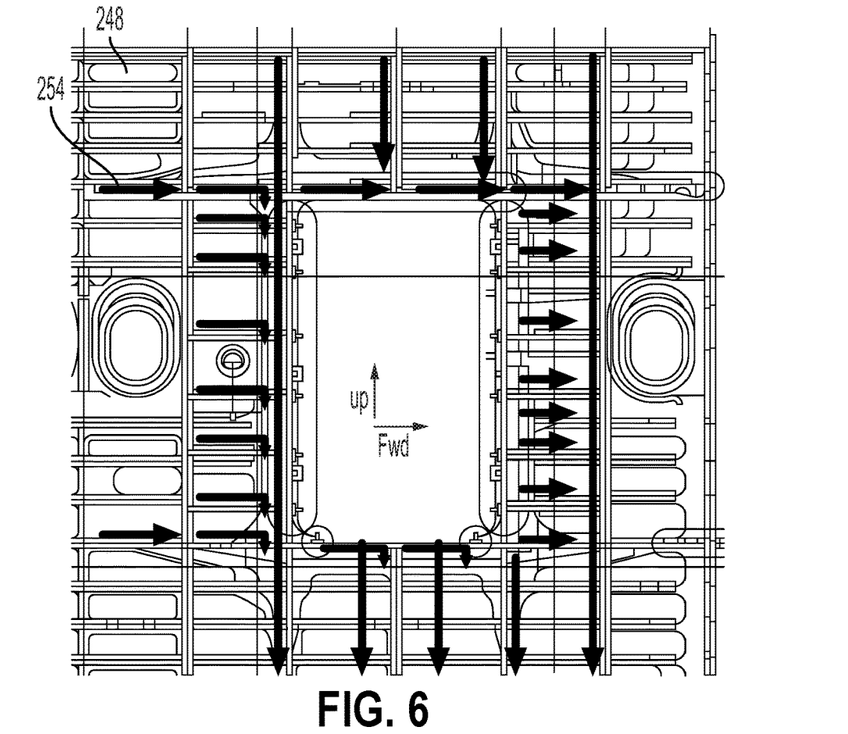
FIG. 6 shows another view of an example of the drainage path, according to example implementations.
Figure 7:
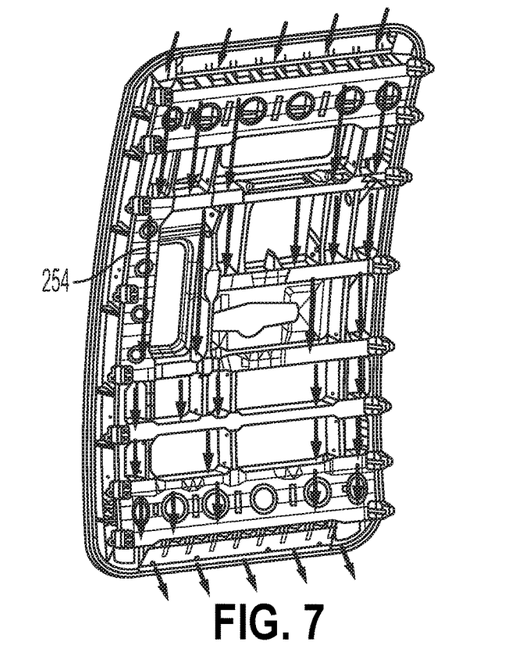
FIG. 7 shows another view of an example of the drainage path, according to example implementations.

FIGS. 6-7 show further views of examples of the drainage path 254, according to example implementations. In FIG. 6, the drainage path 254 is shown to be horizontal and vertical to follow a path created by the structural members 222. In this example, cathodes can be positioned along the structural members 222 to guide the moisture in the drainage path 254 as shown. In FIG. 7, the drainage path 254 is shown as vertically downward along the structural members 222 in which notches 266 are included at positions in the frames 262 and the stringers 264 to enable the moisture to flow downward. FIG. 7 illustrates an example of a door or hatch, which opens and closes, and thus, the drainage path 254 in a downward direction may be more efficient.

Figure 8:
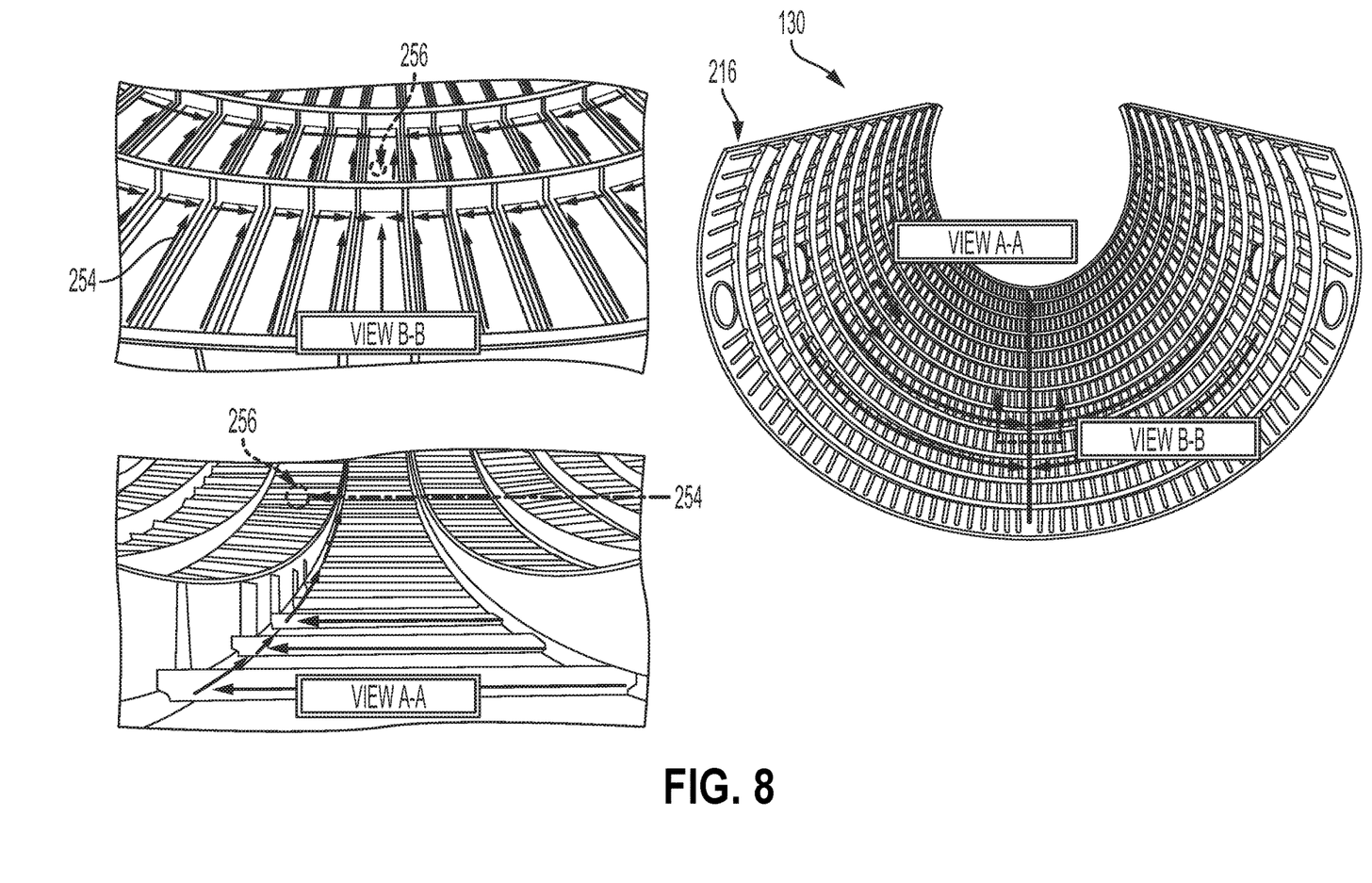
FIG. 8 illustrates an end view and side views of the fuselage with examples of the drainage path, according to an example implementation.

FIG. 8 illustrates an end and side views of the fuselage 130 with examples of the drainage path 254, according to an example implementation. In the end view, the drainage paths 254 are shown by arrows, and illustrate that moisture can flow downward along a curved portion of the outer wall 216 of the fuselage 130. Further, the side views along lines A-A and B-B illustrate that the moisture can flow in a forward direction as well toward the drainage port 256.

Figure 9:
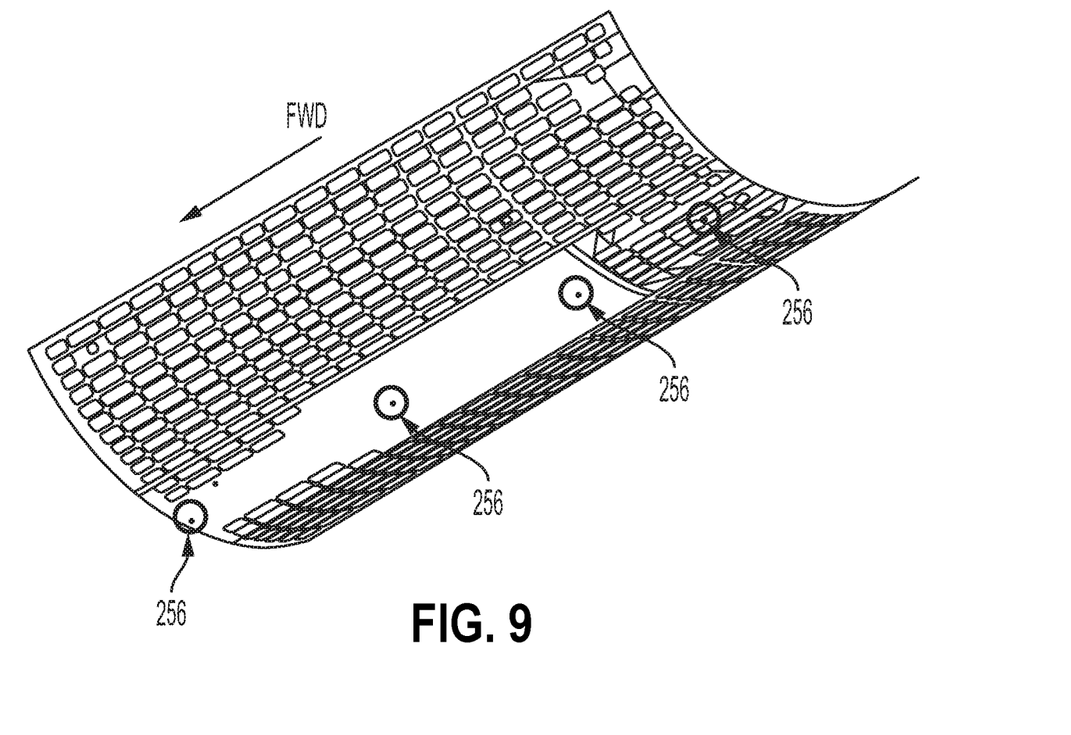
FIG. 9 illustrates another perspective view of a portion of the fuselage illustrating example locations of the drainage port.

FIG. 9 illustrates another perspective view of a portion of the fuselage 130 illustrating example locations of the drainage port 256. In FIG. 9, the fuselage 130 is shown with multiple drainage ports positioned along a center and the bottom 250 of the fuselage 130.

Figure 10:
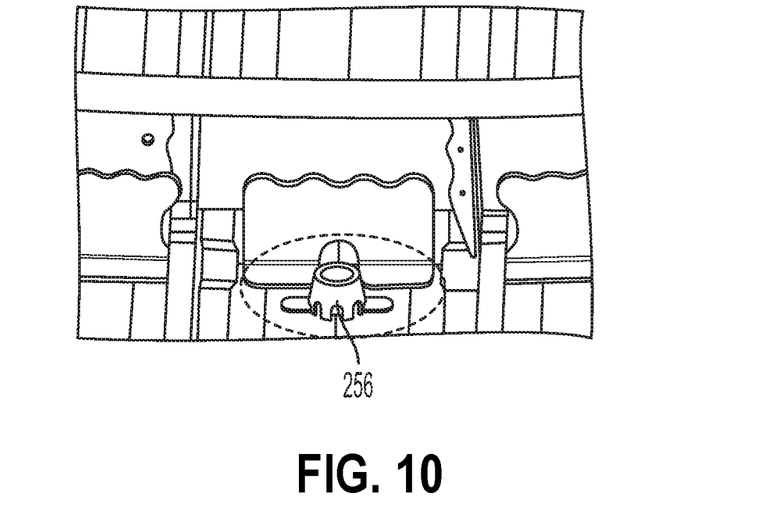
FIG. 10 illustrates a detailed view of an example of the drainage port, according to an example implementation.

FIG. 10 illustrates a detailed view of an example of the drainage port 256. The drainage port 256 can include an internal valve, as described above, which remains closed when pressurized and open when non-pressurized, for example.

Figure 11:
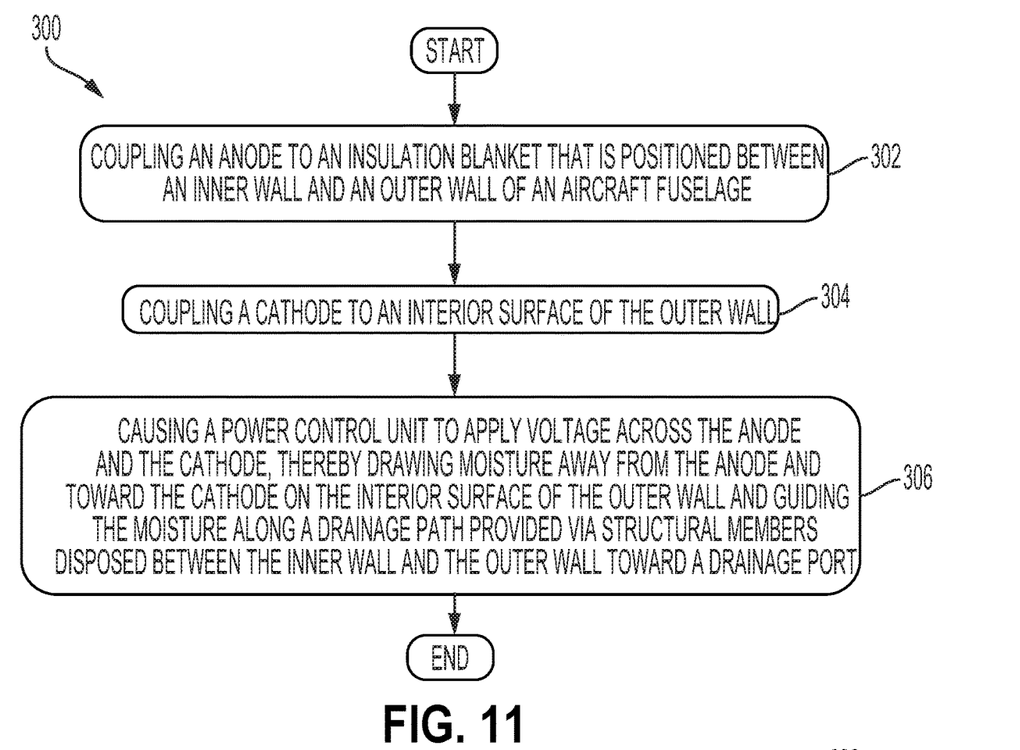
FIG. 11 shows a flowchart of an example of a method for controlling moisture in the aircraft, according to an example implementation.

FIG. 11 shows a flowchart of an example of a method 300 for controlling moisture in the aircraft 100, according to an example implementation. Method 300 shown in FIG. 11 presents an example of a method that could be used with the moisture control system 242 described herein. Method 300 may include one or more operations, functions, or actions as illustrated by one or more of blocks 302-306.

At block 302, the method 300 includes coupling the anode 244 to the insulation blanket 214 that is positioned between the inner wall 208 and the outer wall 216 of the fuselage 130. At block 304, the method 300 includes coupling the cathode 246 to the interior surface 248 of the outer wall 216. At block 306, the method 300 includes causing the power control unit 252 to apply voltage across the anode 244 and the cathode 246, thereby drawing moisture away from the anode 244 and toward the cathode 246 on the interior surface 248 of the outer wall 216 and guiding the moisture along the drainage path 254 provided via the structural members 222 disposed between the inner wall 208 and the outer wall 216 toward the drainage port 256.

Figure 12:
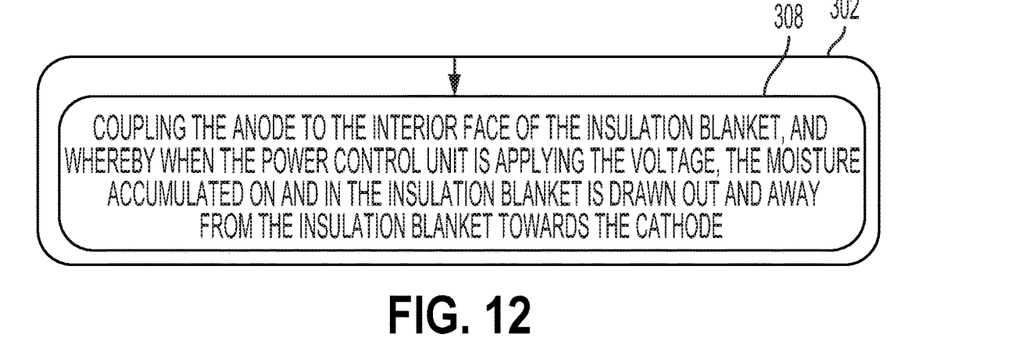
FIG. 12 shows a flowchart of an example method for use in performing the coupling as shown in block, according to an example implementation.

FIG. 12 shows a flowchart of an example method for use in performing the coupling as shown in block 302, according to an example implementation. In particular, the flowchart in FIG. 12 relates to an example implementation in which the insulation blanket 214 includes the exterior face 258 positioned adjacent to the interior surface 248 and the interior face 260 opposite the exterior face 258. At block 308, functions include coupling the anode 244 to the interior face 260 of the insulation blanket 214, and whereby when the power control unit 252 is applying the voltage, the moisture accumulated on and in the insulation blanket 214 is drawn out and away from the insulation blanket 214 towards the cathode 246.

Figure 13:
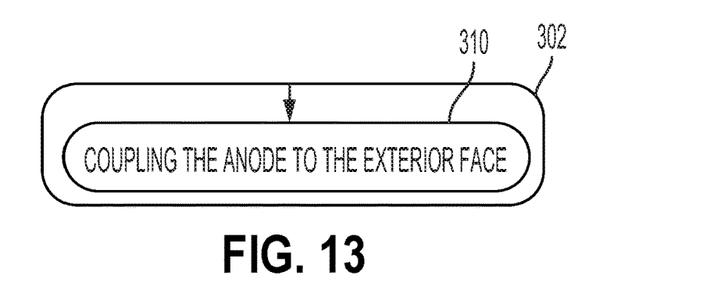
FIG. 13 shows a flowchart of another example method for use in performing the coupling as shown in block, according to an example implementation.

FIG. 13 shows a flowchart of another example method for use in performing the coupling as shown in block 302, according to an example implementation. In particular, the flowchart in FIG. 13 relates to an example implementation in which the insulation blanket 214 includes the exterior face 258 positioned adjacent to the interior surface 248 and the interior face 260 opposite the exterior face 258. At block 310, functions include coupling the anode 244 to the exterior face 258.

Figure 14:
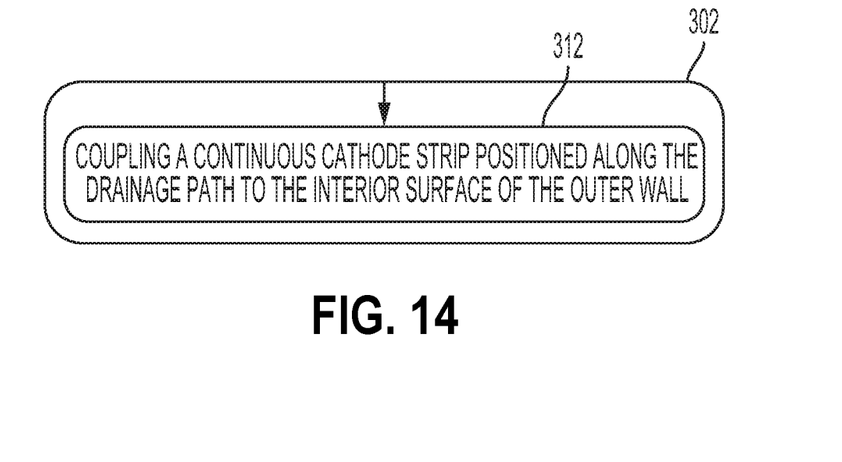
FIG. 14 shows a flowchart of another example method for use in performing the coupling as shown in block, according to an example implementation.

FIG. 14 shows a flowchart of another example method for use in performing the coupling as shown in block 302, according to an example implementation. At block 312, functions include coupling a continuous cathode strip positioned along the drainage path 254 to the interior surface 248 of the outer wall 216.

Figure 15:
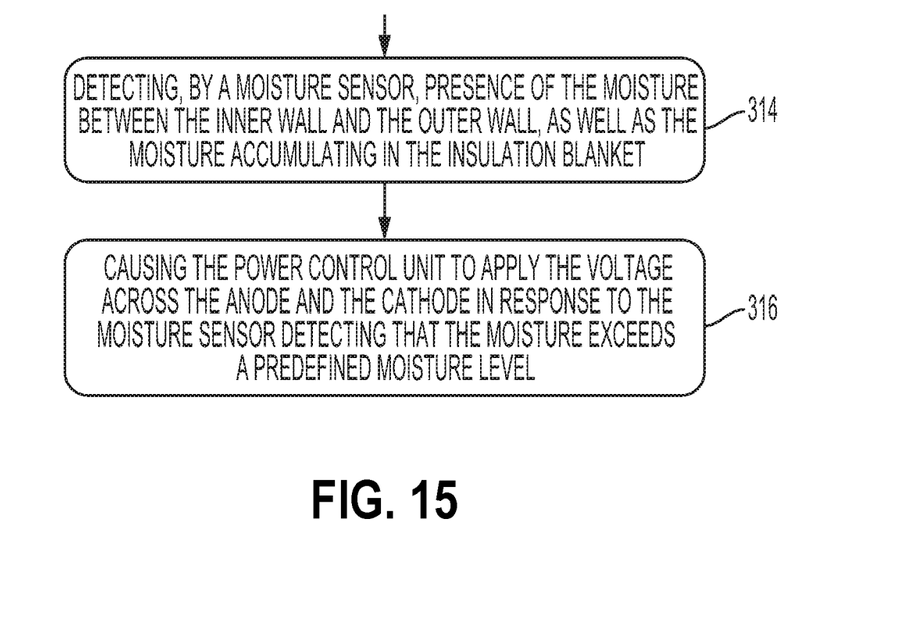
FIG. 15 shows a flowchart of another example method for use with the method of FIG. 11, according to an example implementation.

FIG. 15 shows a flowchart of another example method for use with the method 300 of FIG. 11, according to an example implementation. At block 314, functions include detecting, by the moisture sensor 268, presence of the moisture between the inner wall 208 and the outer wall 216, as well as the moisture accumulating in the insulation blanket 214. At block 316, functions include causing the power control unit 252 to apply the voltage across the anode 244 and the cathode 246 in response to the moisture sensor 268 detecting that the moisture exceeds a predefined moisture level.

Devices or systems may be used or configured to perform logical functions presented in FIGS. 11-15. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Although blocks in FIGS. 11-15, are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for these and other processes and methods disclosed herein, flowcharts show functionality and operation of one possible implementation of present examples. In this regard, some blocks or portions of some blocks may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, some blocks or portions of some blocks in FIGS. 11-15 may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Using examples described herein, by passing a low voltage pulsating charge between positive and negative electrodes, water is ionized and drawn towards the negative electrodes that are placed on the fuselage skin. A pulsing, low-voltage current pushes positive ions toward the negative electrode charged area, dragging water molecules with them. A resulting flow is termed electro osmotic flow. Thus, electro-osmotic pulses (EOP) are beneficial to efficiently remove water from the fuselage skin and avoid drawbacks with existing systems in which passive dams and blockage areas are generally used to route water, with no action moving the water.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A moisture control system, comprising:
    an anode coupled to an insulation blanket that is positioned between an inner wall and an outer wall of an aircraft fuselage;
    a cathode coupled to an interior surface of the outer wall; and
    a power control unit coupled to the anode and the cathode to apply voltage across the anode and the cathode, and when the voltage is applied across the anode and the cathode, moisture is drawn away from the anode and toward the cathode on the interior surface of the outer wall and guided along a drainage path provided via structural members disposed between the inner wall and the outer wall toward a drainage port.

2. The moisture control system of claim 1, wherein the insulation blanket includes an exterior face positioned adjacent to the outer wall and an interior face opposite the exterior face, and
    wherein the anode is coupled to the interior face of the insulation blanket, and wherein when the voltage is applied, the moisture accumulated on and in the insulation blanket is drawn out and away from the insulation blanket towards the cathode.

3. The moisture control system of claim 1, wherein the insulation blanket includes an exterior face positioned adjacent to the outer wall and an interior face opposite the exterior face, and
    wherein the anode is coupled to the exterior face of the insulation blanket.

4. The moisture control system of claim 1, wherein the cathode includes a continuous cathode strip positioned along the drainage path.

5. The moisture control system of claim 1, wherein the cathode is partitioned into a plurality of discrete cathodes positioned along the drainage path.

6. The moisture control system of claim 1, wherein the structural members include frames interconnected with stringers, and
    wherein the frames and the stringers include notches through which the moisture flows as the moisture is guided along the drainage path.

7. The moisture control system of claim 1, further comprising:
    a moisture sensor configured to detect presence of the moisture between the inner wall and the outer wall, as well as the moisture accumulating in the insulation blanket,
    wherein the power control unit is further configured to apply the voltage in response to the moisture sensor detecting that the moisture exceeds a predefined moisture level.

8. An aircraft comprising:
    a fuselage comprising an inner wall, an outer wall, and structural members coupled between the inner wall and the outer wall, wherein the structural members form a drainage path terminating at a drainage port;
    an insulation blanket positioned between the inner wall and the outer wall;
    an anode coupled to the insulation blanket;
    a cathode coupled to an interior surface of the outer wall; and
    a power control unit coupled to the anode and the cathode to apply voltage across the anode and cathode, and when the voltage is applied across the anode and the cathode, moisture is drawn away from the anode and toward the cathode on the interior surface of the outer wall and guided along a drainage path provided via the structural members toward the drainage port.

9. The aircraft of claim 8, wherein the structural members include frames interconnected with stringers, and wherein the frames and the stringers include notches through which the moisture flows as the moisture is guided along the drainage path.

10. The aircraft of claim 8, wherein the outer wall of the fuselage includes an electrically conductive material.

11. The aircraft of claim 8, wherein the insulation blanket includes an exterior face positioned adjacent to the outer wall and an interior face opposite the exterior face, and
wherein the anode is coupled to the interior face of the insulation blanket, and wherein when the voltage is applied, the moisture accumulated on and in the insulation blanket is drawn out and away from the insulation blanket towards the cathode.

12. The aircraft of claim 8, wherein the insulation blanket includes an exterior face positioned adjacent to the outer wall and an interior face opposite the exterior face, and
wherein the anode is coupled to the exterior face of the insulation blanket.

13. The aircraft of claim 8, wherein the cathode includes a continuous cathode strip positioned along the drainage path.

14. The aircraft of claim 8, wherein the cathode is partitioned into a plurality of discrete cathodes positioned along the drainage path.

15. The aircraft of claim 8, wherein the drainage port is closed when the fuselage is pressurized, and wherein the drainage port opens automatically when the fuselage is non-pressurized.

16. A method for controlling moisture in an aircraft, the method comprising:
coupling an anode to an insulation blanket that is positioned between an inner wall and an outer wall of an aircraft fuselage;
coupling a cathode to an interior surface of the outer wall; and
causing a power control unit to apply voltage across the anode and the cathode, thereby drawing moisture away from the anode and toward the cathode on the interior surface of the outer wall and guiding the moisture along a drainage path provided via structural members disposed between the inner wall and the outer wall toward a drainage port.

17. The method of claim 16, wherein the insulation blanket includes an exterior face positioned adjacent to the outer wall and an interior face opposite the exterior face, and
wherein coupling the anode to the insulation blanket of the aircraft comprises coupling the anode to the interior face of the insulation blanket, and whereby when the power control unit is applying the voltage, the moisture accumulated on and in the insulation blanket is drawn out and away from the insulation blanket towards the cathode.

18. The method of claim 16, wherein the insulation blanket includes an exterior face positioned adjacent to the outer wall and an interior face opposite the exterior face, and
wherein coupling the anode to the insulation blanket comprises coupling the anode to the exterior face.

19. The method of claim 16, wherein coupling the cathode to the interior surface of the outer wall comprises coupling a continuous cathode strip positioned along the drainage path to the interior surface of the outer wall.

20. The method of claim 16, further comprising:
detecting, by a moisture sensor, presence of the moisture between the inner wall and the outer wall, as well as the moisture accumulating in the insulation blanket;
wherein causing the power control unit to apply the voltage across the anode and the cathode comprises causing the power control unit to apply the voltage across the anode and the cathode in response to the moisture sensor detecting that the moisture exceeds a predefined moisture level.

* * * * *